Aug. 18, 1925.

S. I. FEKETE 1,550,526

AUTOMOBILE BODY AND FRAME THEREFOR

Filed March 11, 1922 2 Sheets-Sheet 1

INVENTOR:
Stephen Ivan Fekete
Macleod, Calvo, Copeland & Dike
Attys.

Aug. 18, 1925.

S. I. FEKETE 1,550,526

AUTOMOBILE BODY AND FRAME THEREFOR

Filed March 11, 1922    2 Sheets-Sheet 2

INVENTOR:
Stephen Ivan Fekete
by MacLeod, Calver, Copeland & Dike
Attys.

Patented Aug. 18, 1925.

1,550,526

UNITED STATES PATENT OFFICE.

STEPHEN IVAN FEKETE, OF DETROIT, MICHIGAN, ASSIGNOR TO ESSEX MOTORS, OF DETROIT, MICHIGAN, A CORPORATION OF MICHIGAN.

AUTOMOBILE BODY AND FRAME THEREFOR.

Application filed March 11, 1922. Serial No. 542,828.

*To all whom it may concern:*

Be it known that I, STEPHEN IVAN FEKETE, a citizen of the United States, residing at Detroit, county of Wayne, State of Michigan, have invented a certain new and useful Improvement in Automobile Bodies and Frames Therefor, of which the following is a specification, reference being had therein to the accompanying drawings.

My invention relates to an automobile body for closed cars together with a frame therefor. The particular object of the invention is to provide a closed body which can be constructed for the same or a little more than the cost of an ordinary open body. To that end I have employed a novel frame composed largely of straight pieces of wood, thereby reducing the expense for labor, since the waste is almost entirely eliminated, greatly increasing the convenience of assembling and consequently the rapidity and economy with which the body can be constructed. The novel frame, forming part of my invention, includes in part a base assembly and a top assembly, which can be constructed separately from the other parts and then assembled with suitable vertical posts. Another important feature of the invention is the use of horizontal side rails located above the wheel houses and supported at the front ends by the door posts, and at the rear ends by an inclined member or members extending upwardly from the base, the whole top structure being supported by the side rails. These side rails form part of an arch-like structure on which the load of the top is carried, thereby giving a very strong construction with the use of a minimum of lumber. The portion of the body from the side rail down is sheathed with metal which substantially stiffens and strengthens the structure, but the portion of the top from the side rail up is conveniently covered with non-metallic flexible material, such as leather or imitation leather.

As will be seen from the following description, the parts of the frame can be cut to the required shape with practically no band saw work, the base assembly and the top assembly put together, and the whole assembly by chain assembly methods now commonly employed in automobile factories. In practice I find it possible not only to assemble the frame on the chain but also to put in place the metal sheathing and other covering material and to paint the body while it is being carried forward on a suitable carriage by the assembly chain.

The invention will be fully understood from the following description when taken in connection with the accompanying drawings, and the novel features thereof will be pointed out and clearly defined in the claims at the close of this specification.

In the drawings, Fig. 1 is a side elevation embodying my invention.

Figure 2:
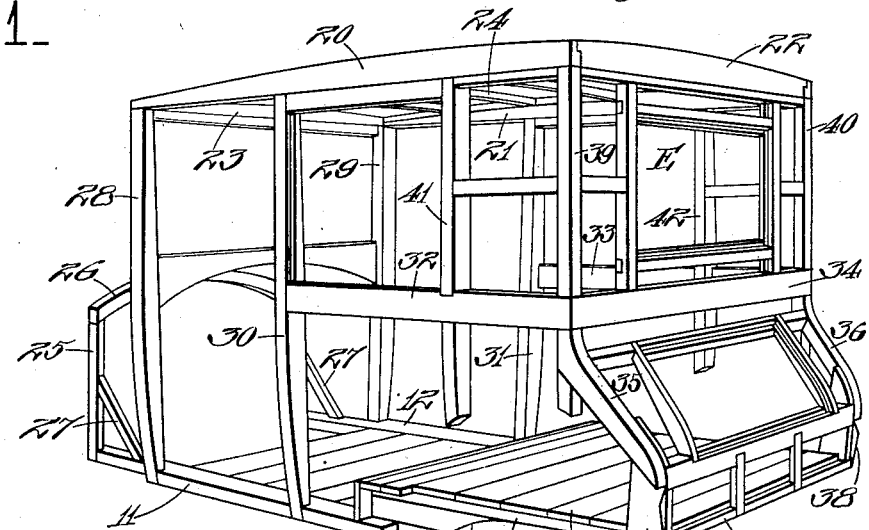
Fig. 2 is a view in perspective of the frame.
Figure 3:
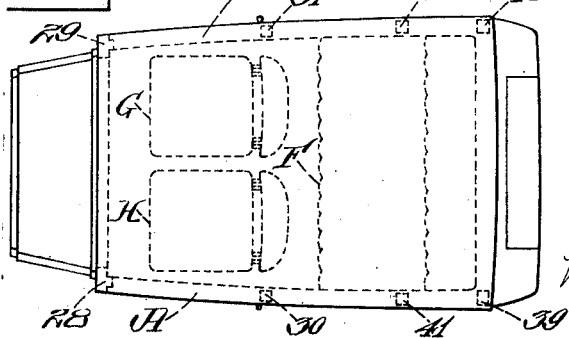
Fig. 3 is a top plan view of the body shown in Fig. 1.
Figure 4:
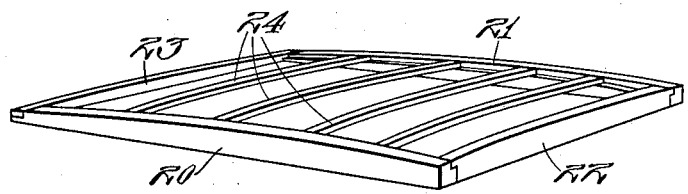
Fig. 4 is a view in perspective of the top assembly.

Referring now to the drawings, the body when complete has two front doors A and B, side windows, two of which are shown at C and D, and a rear window, space for which is shown at E in Figure 2, a rear bench seat F and two so-called Pullman seats G and H.

Figure 5:
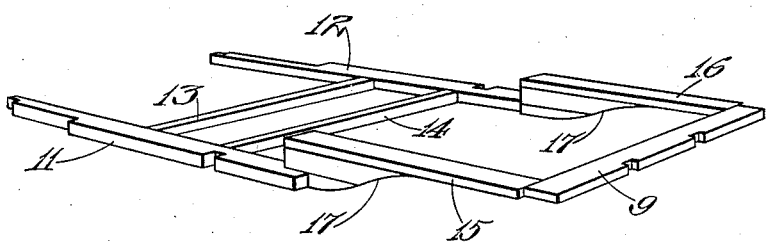
Fig. 5 is a view in perspective of the frame of the base assembly before the floor boards are applied.

The frame will now be described. The base assembly consists of two short, substantially straight sill members 11 and 12 connected by cross members 13 and 14. The rear ends of the sill members connect with two rear sill members 15 and 16 which are substantially straight and the rear ends of which are connected by a rear cross member 9. These rear sill members 15 and 16 are inwardly offset from the forward sill members 11 and 12, so that this portion of the frame as shown in Fig. 5 is narrowed to give room for the wheel houses. These members are also cut away and shaped as shown at 17—17 to follow the shape of the kick-up of the frame of the vehicle. Flooring boards 18 are placed on the base assembly to complete it.

The roof assembly comprises rectangular frame composed of longitudinal members 20—21, front and rear cross members 22, 23, and slots 24. As shown in the drawings, these parts are curved slightly to provide for proper shedding of water.

At the extreme front end of the base assembly is placed the cowl frame, which consists of two vertical members, one of which 25 is shown in Figure 2, a curved cross member 26, and braces 27. At 28 and 29 are shown the front corner posts of the body. These extend from the sills 11 and 12 to the roof assembly. At 30 and 31 are shown door posts likewise extending from the base to the roof.

Figure 1:
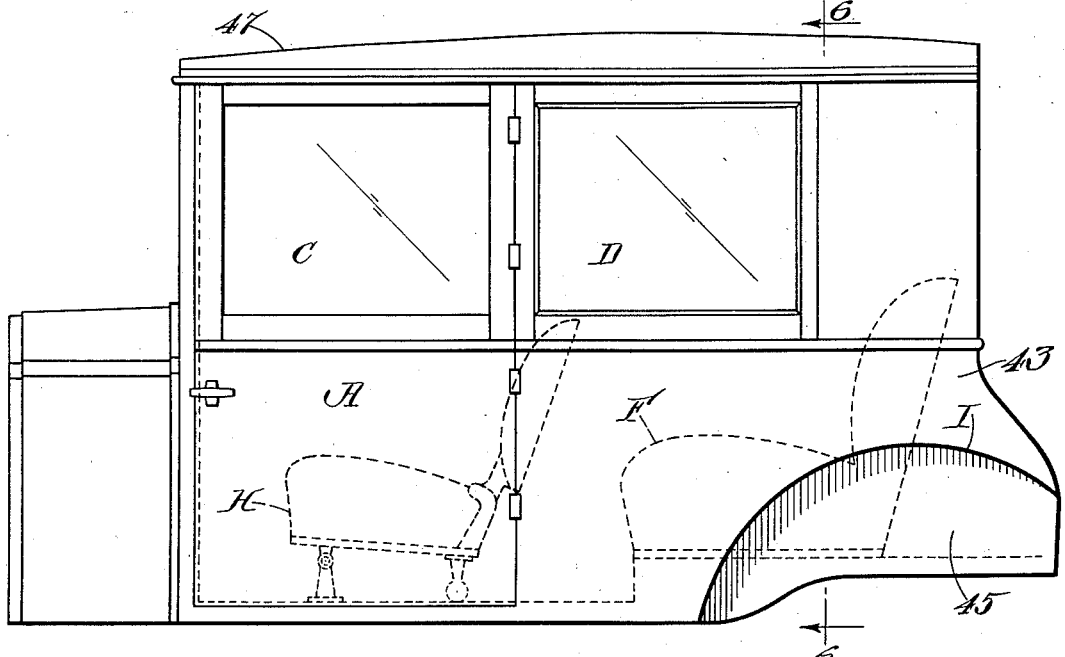

Rearwardly extending from the door posts 30 and 31 are a pair of side rails 32 and 33, the rear ends of which are connected by a rear rail 34. The rear ends of the side rails are supported by inclined members 35 and 36 which extend downwardly and are supported from the base assembly by short posts 37 and 38. It will be understood, of course, that these inclined members 35 and 36 might probably extend all the way to the base, no posts 37 and 38 being then employed. The wheel houses are located at the sides of the rear sill members or sections 15 and 16, as indicated at I in Figure 1. Rear corner posts 39 and 40 extend from the top assembly down to the wheel housing, being connected to and carried by the side rails 32 and 33 and the inclined members 35 and 36. Intermediate posts 41, 42 also extend from the wheel housing to the roof. Braces and cross members secured to the main frame members, already described, may be employed as desired, their location depending largely on the location of the windows and other variable details of design. As they do not form any part of my present invention I have not described them.

From the side rails down, the body is covered with sheet metal plates shaped to follow the outline of the frame. These plates are secured to the frame at convenient intervals and materially stiffen and strengthen the entire structure.

Figure 6:
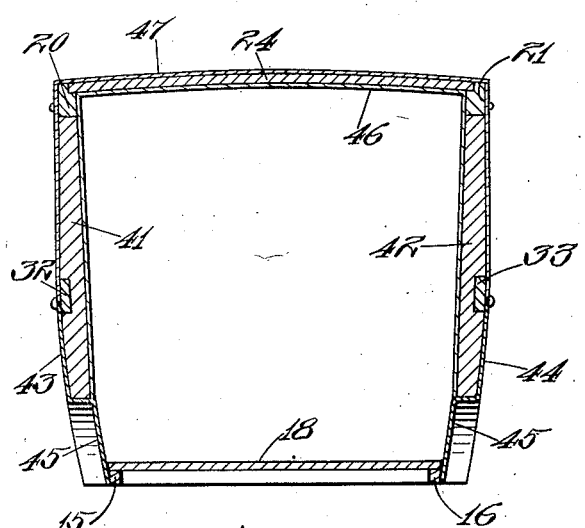
Fig. 6 is a section on line 6—6 of Fig. 1, illustrating the construction of the body about the wheel houses and showing the covering material.

The construction of the wheel houses will be clearly seen from Figure 6. It will be seen that the side plates 43, 44 extend inwardly into the wheel housing and then downwardly to the bottom of the body. It will also be seen that the wall 45 of the wheel houses lies well within the plane of the outer faces of the forward sill members or sections 11 and 12, and consequently within the plane of the side walls of the body and that the vertical posts 39, 40, 41 and 42, which are carried by the side rails 32, 33 are outside the plane of this face of the wheel house. This I believe to be an entirely novel construction, which permits the sheathing around the wheel house to strengthen the body while allowing full width inside the body, and permitting considerable simplification in the framing, owing to the fact that the side rails support the upper part of the body.

Such portions of the body above the side rails as are not closed by windows are covered with non-metallic flexible sheet material, as for instance leather or enamel cloth as shown at 46. The top is also covered with a suitable material of a similar character, as shown at 47.

What I claim is:—

1. An automobile body frame including a base assembly and a roof assembly, a pair of front corner posts and a pair of door posts extending from the base to the roof, rear corner posts extending downward from the roof to a point short of the base, side rails extending backward from the door posts to the rear corner posts, and rearwardly inclined supporting members through which the rear corner posts are supported from the base assembly.

2. In an automobile body, the combination of a roof, a base extending to a point at the rear of the rearmost extremity of said roof, door posts, wheel houses, side rails extending rearwardly from the door posts to the rear of the body above the wheel houses, rear corner posts supported by the side rails, and rearwardly inclined members through which the rear ends of the side rails are supported from the base.

3. In an automobile body frame, and in combination, a base assembly, and a roof assembly, door posts extending from the base assembly to the roof assembly, side rails extending rearwardly from the door posts to the rear of the body above the wheel house spaces, inclined members through which the rear ends of the side rails are supported from the base assembly, rear corner posts and intermediate posts supported by the side rails and themselves supporting the roof assembly.

4. In an automobile body, the combination of a base having a pair of substantially straight sill members and a second pair of substantially straight sill members located in the rear of said first named sill members and offset inwardly therefrom, wheel houses set laterally into said base and rising above the same, side rails located immediately over said wheel houses, and means for supporting said side rails entirely from said base and independently of said wheel houses.

5. In an automobile body, the combination with a base comprising a forward portion and a rear portion narrower than said forward portion, said portions comprising divided longitudinal sills which are substantially straight throughout, of wheel houses at the sides of said rear portion and set laterally within the plane of the sides of said forward portion, and body framing supported entirely from said base independently of said wheel houses.

6. In an automobile body, the combination of a base having substantially straight sills comprising forward sections, and rear sections whose outer faces are offset inwardly from the outer faces of said forward sections, wheel houses at the sides of said rear sections and set laterally within the plane of the outer faces of said forward sections, and body framing supported entirely from said base independently of said wheel houses.

7. In an automobile body, the combination of a base having substantially straight sills comprising forward sections, and rear sections whose outer faces are offset inwardly from the outer faces of said forward sections, wheel houses at the sides of said rear sections and set laterally within the plane of the outer faces of said forward sections, side rails located immediately over said wheel houses, and means for supporting said side rails entirely from said base and independently of said wheel houses at points in front of and at the rear of the latter.

8. In an automobile body, the combination of sheet metal wheel houses, and body framing which includes a pair of door posts forward of the wheel houses, a pair of side rails above the wheel houses and supported at their front ends by the said door posts, rearwardly inclined members supporting the rear ends of the side rails, and rear corner posts carried by the side rails and having their lower ends extending to the wheel houses and their upper ends supporting a roof.

9. In an automobile body, the combination of sheet metal wheel houses and body framing, which includes a pair of door posts forward of the wheel houses, a pair of side rails above the wheel houses and supported at their front ends by the said door posts, rearwardly inclined members supporting the rear ends of the side rails, rear corner posts carried by the side rails and extending from the wheel houses to the roof, and intermediate posts also carried by the side rails and extending from the wheel houses to a point above the side rails.

10. In an automobile body having a roof and base, said base extending to a point at the rear of the rearmost extremity of said roof, the combination with wheel houses, posts forward of the wheel houses, side rails above the wheel houses and supported at their front ends by the said posts, rearwardly inclined members through which the rear ends of the side rails are supported from the base, rear corner posts carried by the side rails and having their lower ends extending to the wheel houses and their upper ends supporting a roof.

11. In an automobile body having a roof and a base, said base extending to a point at the rear of the rearmost extremity of said roof, the combination with wheel houses, posts forward of the wheel houses, side rails above the wheel houses and supported at their front ends by the said posts, rearwardly inclined members through which the rear ends of the side rails are supported from the base, rear corner posts carried by the side rails and extending from the wheel houses to the roof, and intermediate posts also carried by the side rails and extending from the wheel houses to a point above the side rails.

12. An automobile body having wheel houses, framing including side rails above the wheel houses, door posts at the front of the wheel houses, said side rails supported at their front ends by said door posts, inclined members at the rear of said wheel houses supporting the rear ends of said side rails, and vertical members carried by the side rails and with the door posts supporting the top.

In testimony whereof I affix my signature.

STEPHEN IVAN FEKETE.